April 10, 1945. R. M. COLE 2,373,626
APPLICATION OF METAL SULPHIDE CATALYSTS
Filed April 26, 1943
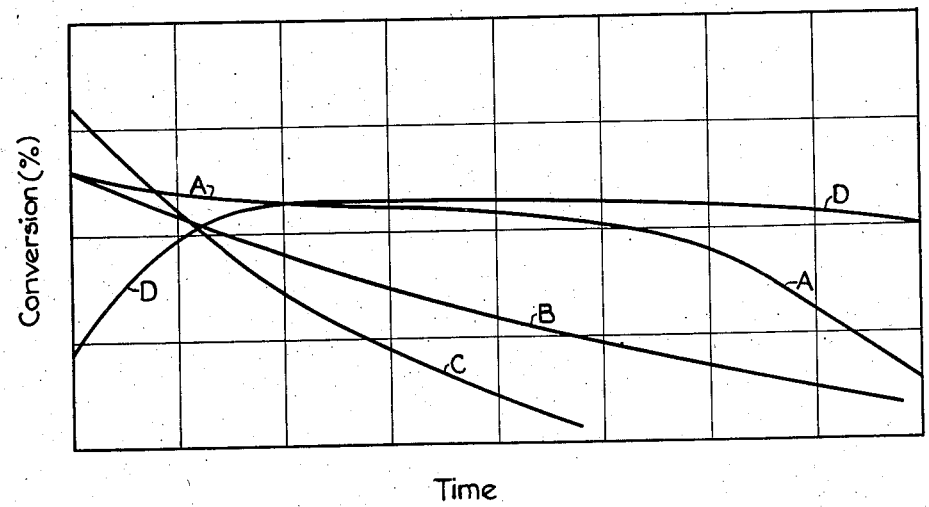
Inventor: Robert M. Cole
By his Attorney: C. J. Ott Patented Apr. 10, 1945

2,373,626

UNITED STATES PATENT OFFICE 2,373,626

APPLICATION OF METAL SULPHIDE CATALYSTS

Robert M. Cole, Long Beach, Calif., assignor to Shell Development Company, San Francisco, Calif., a corporation of Delaware Application April 26, 1943, Serial No. 484,653

11 Claims. (Cl. 196—50)

This invention relates to an improved method for carrying out catalytic conversions with metal sulphide catalysts. More particularly, the invention relates to an improved method for the catalytic treatment of hydrocarbons with metal sulphide catalysts whereby longer process periods may be employed and the production per process period may be increased.

As is known, in the execution of various catalytic reactions with solid catalysts the reaction rate or conversion per pass is a function of the reaction conditions; more specifically, the temperature, pressure and space velocity of the reactant. Thus, in general, the reaction rate or conversion per pass may generally be increased within certain limits by increase of the temperature, increase or decrease of the pressure, or decrease of the space velocity of the reactant. As is also known, in catalytic processes of this type the catalyst gradually declines in activity with use and this tends to give gradually decreasing conversions throughout the length of the process period. In many cases it is recognized that the rate of this decline in catalyst activity is a function of the conditions employed during the process period, being, in general, relatively more severe with increasing severity of the reaction conditions. The problem or aim of such processes is to obtain the maximum production of desired product per volume of catalyst per unit of time. To approach solution of this problem, it is therefore necessary to compromise between relatively high conversions with short process periods and relatively low conversions with long process periods. Theoretically, the optimum results are obtained with a substantially constant maximum conversion retained for the longest possible process period. This theoretical optimum result cannot be obtained in practice but can be approached. This is commonly done by adjusting the initial conditions to give a maximum conversion consistent with a suitable process period. As the catalytic activity of the catalyst declines with time, the severity of the reaction conditions is gradually increased to hold the conversion as near as possible to the initial conversion. After the conversion has declined to an uneconomical point, the process is stopped and the catalyst is regenerated or reactivated, or a new catalyst is substituted and the process is repeated. This is illustrated diagrammatically in Figure I of the attached drawing wherein the conversion is given on the ordinate, the time is given on the abscissa, and the area under the respective curves indicates the production capacity. Thus, in Figure I, curve A represents the best practice as is now known. Referring to curve A it is seen that the conditions are adjusted to give an initial conversion of X, which conversion X is the optimum conversion during the best portion of the process period. The conditions are then adjusted with time to maintain the conversion near X. The activity of the catalyst finally drops to such an extent that it is impossible to retain the conversion near X by increasing the severity of the reaction conditions and the conversion drops relatively rapidly. When the conversion drops to an uneconomical level the process is stopped, that is, the process period is completed. The advantage of this conventional method of operation over other methods is apparent. Thus, for instance, if the conditions employed initially are adjusted to give about the same conversion X and are retained substantially constant, the conversion drops more rapidly as indicated in curve B. The increase in area under curve A over that under curve B (assuming constant space velocity) indicates the amount of superiority of the first-described method. If, however, the conditions required in the first-described method, in order to give a conversion approaching X during the latter part of the process period, are chosen initially and then retained substantially constant, the results are of the type illustrated in curve C. Here, the initial conversion is very high and the conversion drops rapidly giving generally poor results. One of the reasons for this is that, under the relatively severe initial conditions, no appreciable increase in the severity of the conditions with the catalyst age is possible.

The object of the present invention is to provide a method which, when applied in the catalytic treatment of hydrocarbons with metal sulphide catalysts at elevated temperatures above about 400 F., allows substantially increased process periods to be employed and allows a greater production capacity per process period.

It is now found that metal sulphide catalysts when employed in certain conversions, such as hydrogenation, dehydrogenation and desulphurization of hydrocarbons and other organic materials, do not give optimum results when applied in the conventional manner found most efficient for most catalysts, but may be more advantageously employed under special conditions. The reason for this is not definitely known but it is believed that it is due to a dependency of the catalyst activity upon a delicate sulphur balance and state of oxidation in the catalyst.

According to the invention, when employing metal sulphide catalysts of the type more fully described below in processes of the type to be described, the conditions are initially adjusted to give a conversion considerably below X, for instance, only 0.5X to 0.8X, where X, as before, is the maximum conversion per pass reached during the process. The conditions may be suitably adjusted by adjusting the temperature, pressure and/or space velocity either singly or in combination. These means are, however, not equivalent. The preferred means of adjusting the conditions is by the temperature, although this may also be supplemented by the adjustment of other process variables. The conditions are then gradually increased continuously or by steps over a relatively long period as the process continues until the maximum conversion X is finally reached. This very gradual increase in the severity of the reaction conditions, it is to be pointed out, is not proportional to any drop in the activity of the catalyst with use, but results in a substantial increase in the conversion with time until the conversion X is reached. The rate of increase of severity of the reaction conditions and conversion is preferably relatively slow and consistent with the maximum production capacity. Thus, the severity of the conditions is increased at such a rate that the conversion X is reached only after a period of at least 24 hours and preferably somewhat longer, for instance, about three to six days. After attaining the conversion X the conversion is maintained at X or approaching X for the major part of the process by suitable adjustment of the reaction conditions in the known manner. The total process period is at least 500 hours. The type of results obtained using this method of operation is illustrated in the attached drawing, curve D.

The described method of operation is found advantageous in such cases where the predominating active constituent of the catalyst is a metal sulphide. Suitable catalysts comprise one or more metal surphides per se and/or in combination with one or more other materials which may or may not be catalytically active for the conversion in question under the conversion conditions. Particularly suitable catalysts comprise the sulphides of the metals of group VI of the periodic system of the elements preferably in combination with a sulphide of a metal of the iron group. Thus, for example, particularly suitable catalysts consist of or comprise tungsten sulphide alone or in combination with a sulphide of Fe, Co or Ni.

The process of the invention is applicable in various conversions wherein the above-described catalysts are employed to treat or convert gaseous, liquid or solid carbonaceous materials at elevated temperatures above about 400° F. Thus, for example, the process may be advantageously applied in conversions and treatments such as the following: the conversion of phenol, cresols, etc. to aromatics; the dehydrogenation of naphthenes to aromatics; the dehydrogenation of alcohols; the desulphurization of hydrocarbon fractions containing sulphur compounds as impurities; the hydrogenation of olefin polymers and other olefinic material; and the like.

The above-described conversions with the above-described catalysts are generally effected under a superatmospheric pressure of hydrogen.

A particular conversion in which the process of the invention has been found to be particularly effective is the catalytic dehydrogenation of naphthenic hydrocarbons such, in particular, as naphthenic petroleum fractions. Another conversion in which the process of the invention is particularly advantageous is the hydrogenation of unsaturated hydrocarbon fuel fractions such, in particular, as fractions of reformed and/or cracked gasolines. These conversions are usually carried out under 10–100 atmospheres pressure of hydrogen and at temperatures (during the main portion of the process period) ranging between about 880° F. and 960° F.

The following examples illustrate a suitable application of the process of the invention and the improvement of the method of the invention over the conventional method of operation:

*Example I*

Naphthenic naphtha containing methyl cyclohexane was treated in the conventional manner with a tungsten-nickel sulphide catalyst containing the tungsten and nickel in a mol ratio of about 1:1.8, under conditions conducive to more or less selectively dehydrogenate the methyl cyclohexane to toluene. The conditions employed and the conversions (of the available methyl cyclohexane to toluene) obtained are given in the following table:

| | Time, hours | | | | | | |
|---|---|---|---|---|---|---|---|
| | 25 | 50 | 160 | 200 | 400 | 700 | 1,000 |
| Temperature °F | 860 | 860 | 860 | 880 | 880 | 900 | 900 |
| Pressure | 720 | 720 | 720 | 720 | 720 | 720 | 720 |
| Space velocity | 1.5 | 1.5 | 1.5 | 1.5 | 1.5 | 1.5 | 1.5 |
| Conversion Per cent | 85 | 76 | 74 | 83 | 80 | 78 | 72 |

It is seen that the highest conversion (85%) was obtained initially and that as the conversion level tended to drop the severity of the conditions was gradually increased. At the end of about 1000 hours (42 days) the conversion was down to about 72%. The average conversion over the 1000 hours was about 77%.

*Example II*

The process of Example I was carried out in another run according to the method of the invention. The conditions and conversions after various periods of operation are given in the following table:

| | Time, hours | | | | | | |
|---|---|---|---|---|---|---|---|
| | 25 | 50 | 120 | 200 | 400 | 700 | 1,000 |
| Temperature °F | 840 | 840 | 860 | 880 | 880 | 880 | 880 |
| Pressure | 720 | 720 | 720 | 720 | 720 | 720 | 720 |
| Space velocity | 1.5 | 1.5 | 1.5 | 1.5 | 1.5 | 1.5 | 1.5 |
| Conversion Per cent | 70 | 59 | 76 | 87 | 86 | 85 | 81 |

It is seen that the initial operating conditions were adjusted to give a conversion of only about 80% of X (X=87%) and were brought up to standard conditions (860° F.) only after 120 hours of operation. As a consequence, the conversions during the first five days were considerably below normal. Nevertheless, the conversion at the end of 1000 hours was still 81% (at only 880° F.) and the average conversion over the 1000 hours was about 83%. It will also be seen by comparing the conditions and results at the end of 1000 hours of processing that the process according to Example II could be carried out for an additional extended period of time while still obtaining better results than obtainable at 1000 hours when operating according to the conventional method of Example I.

I claim as my invention:

1. In a process for the catalytic treatment of hydrocarbons in the vapor phase with a metal sulphide catalyst at an elevated temperature of at least 400° F. wherein a hydrocarbon is contacted with a portion of the catalyst under a superatmospheric pressure of hydrogen for a period of at least 500 hours, the method for increasing the process period which comprises initiating the process with fresh catalyst under conditions of temperature to give a conversion per pass less than X, then increasing the temperature during an initial period of from about 24 to 150 hours to give a conversion X, and thereafter continuing the process for a total period in excess of 500 hours while adjusting the conversion conditions to give a conversion approaching X, where X is the maximum conversion per pass reached during the process.

2. In a process for the catalytic dehydrogenation of a vaporizable dehydrogenatable hydrocarbon in the vapor phase with a metal sulphide catalyst at an elevated temperature of at least 400° F. wherein the hydrocarbon to be dehydrogenated is contacted with a portion of the catalyst under a superatmospheric pressure of hydrogen for a process period of at least 500 hours, the method for increasing the process period which comprises initiating the process with fresh catalyst under conditions of temperature to give a conversion per pass less than X, then increasing the temperature during an initial period of from about 24 to 150 hours to give a conversion X, and thereafter continuing the process for a total period in excess of 500 hours while adjusting the conversion conditions to give a conversion approaching X, where X is the maximum conversion per pass reached during the process.

3. In a process for the catalytic hydrogenation of a vaporizable unsaturated hydrocarbon in the vapor phase with a metal sulphide catalyst at an elevated temperature of at least 400° F. wherein the hydrocarbon to be hydrogenated is contacted with a portion of the catalyst under superatmospheric pressure of hydrogen for a period of at least 500 hours, the method for increasing the process period which comprises initiating the process with fresh catalyst under conditions of temperature to give a conversion per pass less than X, then increasing the temperature during an initial period of from about 24 to 150 hours to give a conversion X, and thereafter continuing the process for a total period in excess of 500 hours while adjusting the conversion conditions to give a conversion approaching X, where X is the maximum conversion per pass reached during the process.

4. In a process for the catalytic dehydrogenation of a naphthenic hydrocarbon with a metal sulphide catalyst at an elevated temperature of at least 400° F. wherein the naphthenic hydrocarbon to be dehydrogenated is contacted with a portion of the catalyst under a superatmospheric pressure of hydrogen for a process period of at least 500 hours, the method for increasing the process period which comprises initiating the process with fresh catalyst under conditions of temperature to give a conversion per pass less than X, then increasing the temperature during an initial period of from about 24 to 150 hours to give a conversion X, and thereafter continuing the process for a total period in excess of 500 hours while adjusting the conversion conditions to give a conversion approaching X, where X is the maximum conversion per pass reached during the process.

5. In a process for the catalytic hydrogenation of an olefinic hydrocarbon fraction with a metal sulphide catalyst at an elevated temperature of at least 400° F. wherein the olefinic hydrocarbon fraction to be hydrogenated is contacted with a portion of the catalyst under a superatmospheric pressure of hydrogen for a period of at least 500 hours, the method for increasing the process period which comprises initiating the process with fresh catalyst under conditions of temperature to give a conversion per pass less than X, then increasing the temperature during an initial period of from about 24 to 150 hours to give a conversion X, and thereafter continuing the process for a total period in excess of 500 hours while adjusting the conversion conditions to give a conversion approaching X, where X is the maximum conversion per pass reached during the process.

6. In a process for the catalytic treatment of hydrocarbons in the vapor phase with a metal sulphide catalyst at an elevated temperature of at least 400° F. wherein a hydrocarbon is contacted with a portion of the catalyst under a superatmospheric pressure of hydrogen for a period of at least 500 hours, the method for increasing the process period which comprises initiating the process with fresh catalyst under conditions of temperature to give a conversion per pass not greater than 0.8X, then increasing the temperature during an initial period of from about 24 to 150 hours to give a conversion X, and thereafter continuing the process for a total period in excess of 500 hours while adjusting the conversion conditions to give a conversion approaching X, where X is the maximum conversion per pass reached during the process.

7. In a process for the catalytic treatment of hydrocarbons in the vapor phase with a metal sulphide catalyst comprising as an active constituent a sulphide of a metal of group VI of the periodic system of the elements at an elevated temperature of at least 400° F. wherein a hydrocarbon is contacted with a portion of the catalyst under a superatmospheric pressure of hydrogen for a period of at least 500 hours, the method for increasing the process period which comprises initiating the process with fresh catalyst under conditions of temperature to give a conversion per pass less than X, then increasing the temperature during an initial period of from about 24 to 150 hours to give a conversion X, and thereafter continuing the process for a total period in excess of 500 hours while adjusting the conversion conditions to give a conversion approaching X, where X is the maximum conversion per pass reached during the process.

8. In a process for the catalytic treatment of hydrocarbons in the vapor phase with a metal sulphide catalyst comprising as the predominating active constituents a sulphide of a metal of group VI of the periodic system of the elements and a sulphide of a metal of the iron group at an elevated temperature of at least 400° F. wherein a hydrocarbon is contacted with a portion of the catalyst under a superatmospheric pressure of hydrogen for a period of at least 500 hours, the method for increasing the process period which comprises initiating the process with fresh catalyst under conditions of temperature to give a conversion per pass less than X, then increasing the temperature during an initial period of from about 24 to 150 hours to give a conversion X, and thereafter continuing the process for a total period in excess of 500 hours while adjusting the conversion conditions to give a conversion approaching X, where X is the maximum conversion per pass reached during the process.

9. In a process for the catalytic treatment of hydrocarbons in the vapor phase with a metal sulphide catalyst comprising as the predominating active constituents tungsten sulphide and a sulphide of a metal of the iron group at an elevated temperature of at least 400° F. wherein a hydrocarbon is contacted with a portion of the catalyst under a superatmospheric pressure of hydrogen for a period of at least 500 hours, the method for increasing the process period which comprises initiating the process with fresh catalyst under conditions of temperature to give a conversion per pass less than X, then increasing the temperature during an initial period of from about 24 to 150 hours to give a conversion X, and thereafter continuing the process for a total period in excess of 500 hours while adjusting the conversion conditions to give a conversion approaching X, where X is the maximum conversion per pass reached during the process.

10. In a process for the catalytic treatment of hydrocarbons in the vapor phase with a metal sulphide catalyst comprising as the predominating active constituents a sulphide of tungsten and a sulphide of nickel at an elevated temperature of at least 400° F. wherein a hydrocarbon is contacted with a portion of the catalyst under a superatmospheric pressure of hydrogen for a period of at least 500 hours, the method for increasing the process period which comprises initiating the process with fresh catalyst under conditions of temperature to give a conversion per pass less than X, then increasing the temperature during an initial period of from about 24 to 150 hours to give a conversion X, and thereafter continuing the process for a total period in excess of 500 hours while adjusting the conversion conditions to give a conversion approaching X, where X is the maximum conversion per pass reached during the process.

11. In a process for the catalytic dehydrogenation of a naphthenic petroleum fraction with a metal sulphide catalyst consisting essentially of sulphides of nickel and tungsten at an elevated temperature between about 860° F. and 960° F. wherein the naphthenic petroleum fraction to be dehydrogenated is contacted with a portion of the catalyst under a superatmospheric pressure of hydrogen for a period of at least 500 hours, the method of increasing the process period which comprises initiating the process with fresh catalyst under conditions of temperature to give a conversion per pass not greater than 0.8X, then increasing the temperature during an initial period of from about 3 to 6 days to give a conversion X, and thereafter continuing the process for a total period in excess of 500 hours while adjusting the conversion conditions to give a conversion approaching X, where X is the maximum conversion per pass reached during the process.

ROBERT M. COLE.